United States Patent
Birdi et al.

(10) Patent No.: US 7,476,994 B2
(45) Date of Patent: Jan. 13, 2009

(54) HIGH POWER GENERATOR WITH ENHANCED HEAT REMOVAL

(75) Inventors: Balwinder S. Birdi, Tucson, AZ (US); William M. Scherzinger, Tucson, AZ (US); Mingzhou Xu, Tucson, AZ (US)

(73) Assignee: Honeywell International, Inc., Morristown, NJ (US)

( * ) Notice: Subject to any disclaimer, the term of this patent is extended or adjusted under 35 U.S.C. 154(b) by 438 days.

(21) Appl. No.: 11/359,115

(22) Filed: Feb. 21, 2006

(65) Prior Publication Data

US 2007/0194638 A1 Aug. 23, 2007

(51) Int. Cl.
*H02K 1/32* (2006.01)

(52) U.S. Cl. ............................ 310/61; 310/58; 310/217

(58) Field of Classification Search ................ 310/217, 310/54, 61, 52, 58, 59
See application file for complete search history.

(56) References Cited

U.S. PATENT DOCUMENTS

| | | | |
|---|---|---|---|
| 397,340 A * | 2/1889 | Cohen ......................... 310/265 |
| 1,316,790 A | 9/1919 | Gruber |
| 3,217,193 A | 11/1965 | Rayner |
| 3,439,202 A | 4/1969 | Wanke |
| 3,441,758 A * | 4/1969 | Albright et al. ............... 310/58 |
| 3,480,810 A | 11/1969 | Potter |
| 3,659,125 A | 4/1972 | Basel |
| 3,684,906 A | 8/1972 | Lenz |
| 4,203,044 A | 5/1980 | Linscott, Jr. |
| 4,264,834 A * | 4/1981 | Armor et al. ................... 310/59 |
| 4,286,183 A | 8/1981 | Montgomery |
| 4,496,862 A | 1/1985 | Weber |
| 4,609,840 A * | 9/1986 | Eats et al. ...................... 310/58 |
| 4,691,133 A * | 9/1987 | Mongeau ..................... 310/178 |
| 5,019,733 A | 5/1991 | Kano et al. |
| 5,086,246 A | 2/1992 | Dymond et al. |
| 5,509,381 A | 4/1996 | Fisher |
| 6,703,729 B2 | 3/2004 | Weeber et al. |
| 6,727,609 B2 * | 4/2004 | Johnsen ........................ 310/52 |
| 6,750,572 B2 * | 6/2004 | Tornquist et al. .............. 310/54 |
| 6,943,469 B2 * | 9/2005 | Nelson .......................... 310/55 |
| 7,015,617 B2 * | 3/2006 | Tornquist et al. ............. 310/216 |
| 7,141,898 B2 * | 11/2006 | Thiot ............................ 310/55 |
| 2005/0023924 A1 | 2/2005 | Tomquist et al. |

* cited by examiner

Primary Examiner—Michael C Zarroli
(74) Attorney, Agent, or Firm—Oral Caglar, Esq.

(57) ABSTRACT

A high speed, high power generator has its main stator and main rotor configured to provide enhanced cooling capability. The generator includes a generator housing, a stator, a shaft, and a rotor. The stator is mounted within the generator housing. The shaft is rotationally mounted within the generator housing, and includes an inner surface that defines an internal fluid flow passage, an outer surface, and a plurality of interlamination cooling supply orifices extending between the shaft inner and outer surfaces. The rotor is mounted on the shaft and includes a plurality of poles formed from laminations, and one or more interlamination disks. Each interlamination disk is disposed between at least two of the laminations and includes a plurality of interlamination flow passages that receive a cooling medium from the shaft and direct the cooling medium, via centrifugal force, through the rotor and onto the stator.

20 Claims, 5 Drawing Sheets

HIGH POWER GENERATOR WITH ENHANCED HEAT REMOVAL

TECHNICAL FIELD

The present invention relates to relatively high power generators and, more particularly, to high power generators that are used with gas turbine engines such as those used in aircraft, tanks, ships, terrestrial vehicles, or other applications.

BACKGROUND

Many vehicles, including aircraft, ships, and some terrestrial vehicles, include AC generator systems to supply relatively constant frequency AC power. Many of the AC generator systems installed in these vehicles include three separate brushless generators, namely, a permanent magnet generator (PMG), an exciter, and a main generator. The PMG includes a rotor having permanent magnets mounted thereon, and a stator having a plurality of windings. When the PMG rotor rotates, the permanent magnets induce AC currents in PMG stator windings. These AC currents are typically fed to a regulator or a control device, which in turn outputs a DC current to the exciter.

The exciter typically includes single-phase (e.g., DC) stator windings and multi-phase (e.g., three-phase) rotor windings. The DC current from the regulator or control device is supplied to exciter stator windings, and as the exciter rotor rotates, three phases of AC current are typically induced in the rotor windings. Rectifier circuits that rotate with the exciter rotor rectify this three-phase AC current, and the resulting DC currents are provided to the main generator. The main generator additionally includes a rotor and a stator having single-phase (e.g., DC) and multi-phase (e.g., three-phase) windings, respectively. The DC currents from the rectifier circuits are supplied to the rotor windings. Thus, as the main generator rotor rotates, three phases of AC current are induced in main generator stator windings. This three-phase AC current can then be provided to a load such as, for example, electrical aircraft systems.

In recent years, vehicles are being designed that rely more and more on electrical power. Thus, there is an ever-increasing demand for enhanced electrical generators, such as the one described above. One way of meeting these demands is through manipulation of the length and diameter ratio of a generator. For a given rotational speed, increasing the diameter of the generator increases the stress levels in the rotating components. Because some electrical generators rotate at relatively high speeds, with potential rotational speeds up to and in excess of 24,000 rpm, the stress levels in rotating components can, upon increasing the generator diameter, reach material limits. Thus, for many vehicles, the increased power demand can only be met by increasing the length of the generator.

As is generally known, some of the electrical components within the generator may generate heat due to electrical losses, and may thus be supplied with a cooling medium. For example, in some generators the main rotor windings and main stator windings are cooled using a cooling medium, such as a lubricant, that flows in and through the generator. In particular, the main rotor and main stator windings are cooled by spraying the cooling medium, via orifices in the main rotor shaft, onto end turns of the main rotor and main stator windings. The cooling medium flow through the main rotor shaft also provides conduction cooling of the main rotor along its axial length. Conduction cooling along the axial length of the main stator is provided via a stator back iron cooling flow path. More specifically, a portion of the cooling medium is directed through a flow path formed in or on the stator back iron.

Although the above described generator cooling configuration provides sufficient cooling for many generators, as the length of the generator is increased the cooling scheme can present certain drawbacks. In particular, the cooling scheme can result in insufficient cooling of the main rotor and main stator near the axially positioned centers, causing relatively high temperature hot spots at or near these locations, which can be detrimental to overall generator performance.

Hence, there is a need for a high speed, high power generator that addresses the above-noted drawback. Namely, a high speed, high power generator that supplies sufficient cooling to its main rotor and main stator even if the length to diameter ratio is increased. The present invention addresses at least this need.

BRIEF SUMMARY

The present invention provides a high speed, high power generator that provides enhanced cooling of the main rotor and main stator near the axially positioned centers thereof.

In one embodiment, and by way of example only, a high power generator includes a generator housing, a stator, a shaft, and a rotor. The stator is mounted within the generator housing. The shaft is rotationally mounted within the generator housing, and includes an inner surface that defines an internal fluid flow passage, an outer surface, and a plurality of interlamination cooling supply orifices extending between the shaft inner and outer surfaces. The internal fluid flow passage is configured to receive a flow of a cooling medium, and each interlamination cooling supply orifice is in fluid communication with the internal fluid flow passage. The rotor is mounted on the shaft and is disposed at least partially within and is spaced apart from the stator to form an air gap there-between. The rotor includes a plurality of poles, and one or more interlamination disks. Each pole extends radially outwardly from the shaft and is formed of at least a plurality of laminations. Each interlamination disk is disposed between at least two of the laminations and includes a plurality of fluid inlets, a plurality of fluid outlets, and a plurality of interlamination flow passages. Each fluid inlet is in fluid communication with one of the shaft interlamination cooling supply orifices, each fluid outlet is in fluid communication with the air gap, and each interlamination flow passage extends between one of the fluid inlets and one of the fluid outlets.

In another exemplary embodiment, a high power generator includes a generator housing, a stator, a shaft, and a rotor. The stator is mounted within the generator housing and includes a plurality of stator core subassemblies and a plurality of main stator windings. Each stator core subassembly is coupled to the generator housing and is spaced apart from at least one other adjacent stator core subassembly to form an inter-stator gap there-between. Each stator winding has at least one end turn and extending into an inter-stator gap. The shaft is rotationally mounted within the generator housing, and includes an inner surface that defines an internal fluid flow passage, an outer surface, and a plurality of interlamination cooling supply orifices. extending between the shaft inner and outer surfaces. The internal fluid flow passage is configured to receive a flow of a cooling medium, and each interlamination cooling supply orifice is in fluid communication with the internal fluid flow passage. The rotor is mounted on the shaft and is disposed at least partially within and is spaced apart from the stator to form an air gap there-between. The rotor includes a plurality of poles, and one or more interlamination disks. Each pole extends radially outwardly from the shaft and is formed of at least a plurality of laminations. Each interlamination disk is disposed between at least two of the laminations and includes a plurality of fluid inlets, a plurality of fluid outlets, and a plurality of interlamination flow passages. Each fluid inlet is in fluid communication with one of the shaft interlamination cooling supply orifices, each fluid outlet is in fluid communication with the air gap, and each interlamination flow passage extends between one of the fluid inlets and one of the fluid outlets.

Other independent features and advantages of the preferred generator will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it is to be appreciated that for convenience of explanation the present embodiment is depicted and described as being implemented in a brushless AC (alternating current) generator. However, the present invention is not limited to a brushless AC generator environment, but may be implemented in other AC generator designs needed in specific applications.

Figure 1:
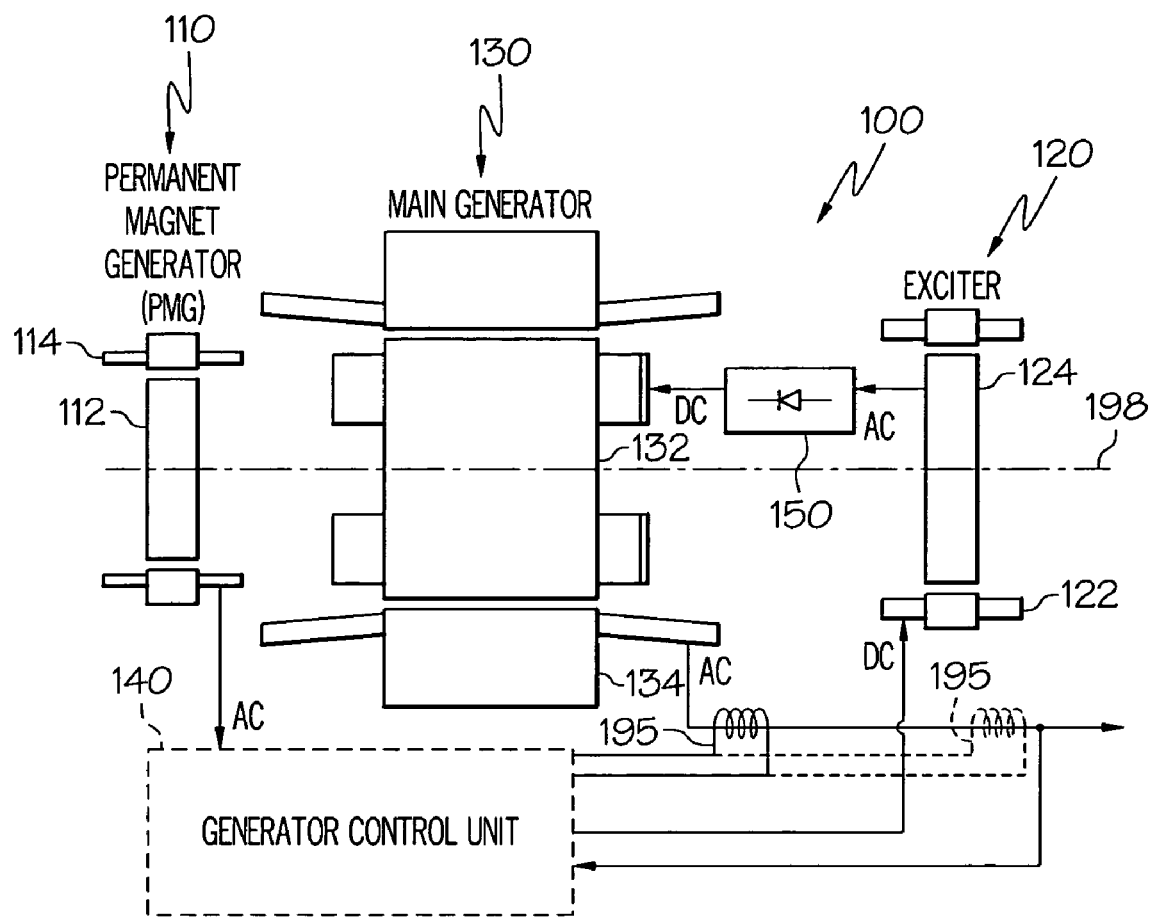
FIG. 1 is a functional schematic diagram of an exemplary high speed generator embodiment.

Turning now to FIG. 1, a functional schematic block diagram of an exemplary high speed generator system 100 for use with a gas turbine engine such as that in an aircraft is depicted. This exemplary generator system 100, which is commonly known as a brushless AC generator, includes a permanent magnet generator (PMG) 110, an exciter 120, a main generator 130, a generator control unit 140, and one or more rectifier assemblies 150. During operation, a rotor 112 of the PMG 110, a rotor 124 of the exciter 120, and a rotor 132 of the main generator 130 all rotate. The rotational speed of these components may vary. In one embodiment, the rotational speed may be, for example, in the range of about 12,000 to about 24,000 r.p.m., or greater. As the PMG rotor 112 rotates, the PMG 110 generates and supplies, via a PMG stator 114, AC power to the generator control unit 140. The generator control unit 140 supplies direct current (DC) power to a stator 122 of the exciter 120. The exciter rotor 124 in turn supplies AC power to the rectifier assemblies 150. The output from the rectifier assemblies 150 is DC power and is supplied to the main rotor 132, which in turn outputs AC power from a main stator 134.

Figure 2:
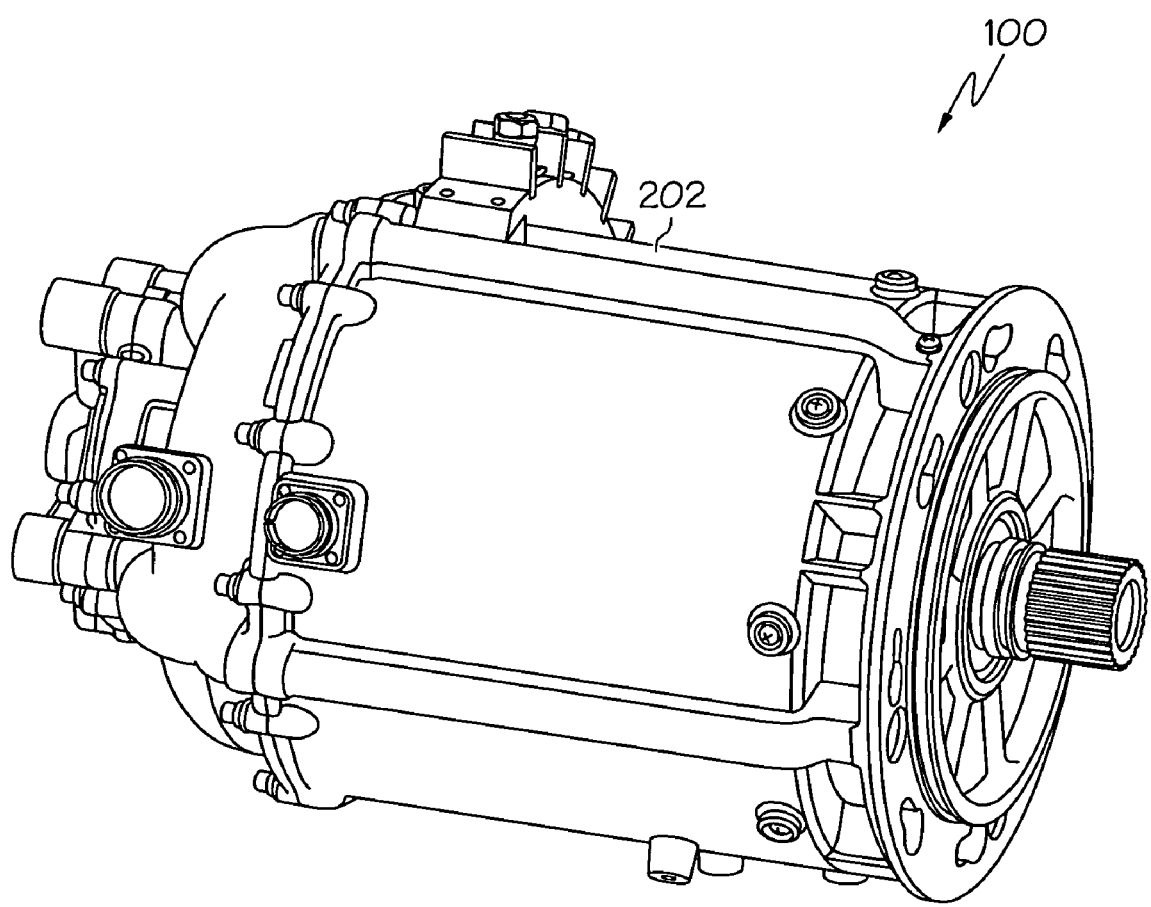
FIG. 2 is a perspective view of a physical embodiment of the generator shown in FIG. 1.

The generator system 100 is capable of providing output power at a variety of frequencies and over a variety of frequency ranges. Further, typically the output power from the main generator stator 134 is three-phase AC power. The generator control unit 140 can regulate the power output based upon monitoring signals provided to it from monitoring devices 195. In the depicted embodiment, the PMG rotor 112, the exciter rotor 124, and the main rotor 132 are all mounted on a common shaft 136, and thus all rotate along a single axis 198 at the same rotational speed. It will be appreciated, however, that this is merely exemplary of a particular preferred embodiment. It will additionally be appreciated that the generator system 100, or at least portions of the system 100, may be housed within a generator housing 202, a perspective view of which is illustrated in FIG. 2.

Figure 3:
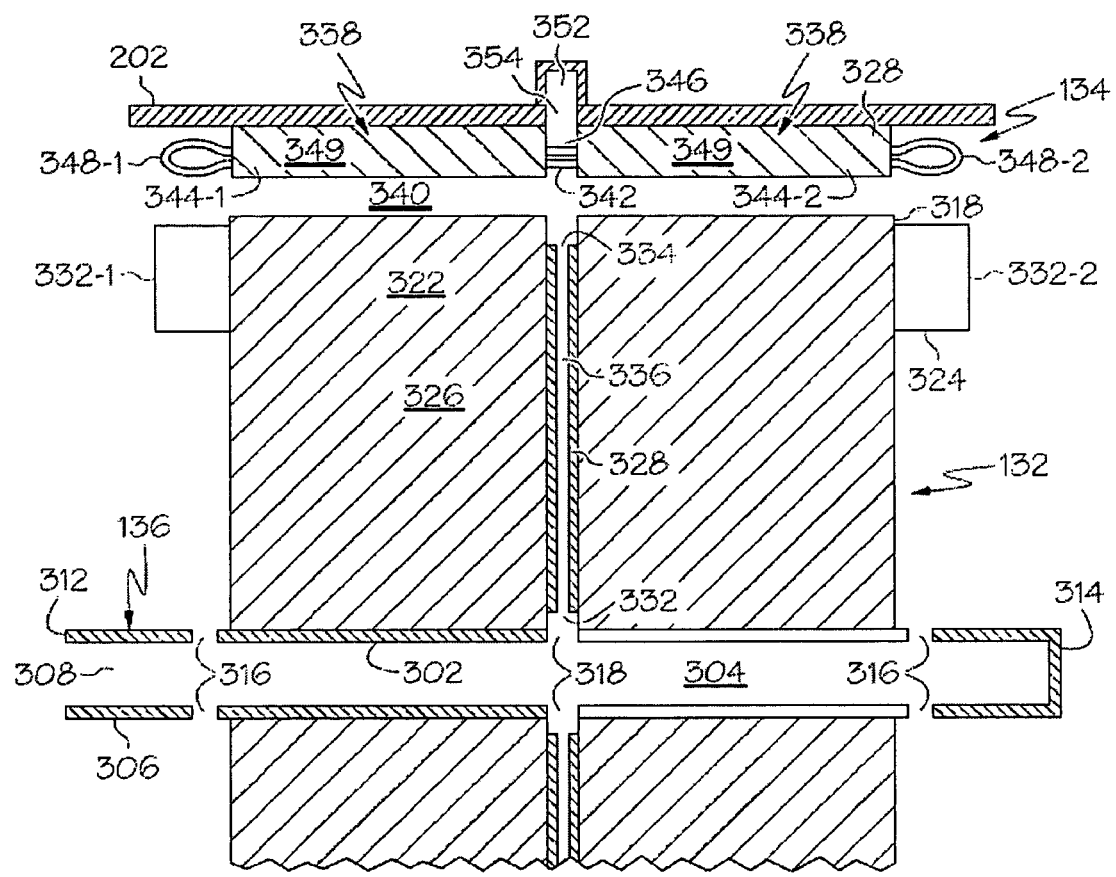
FIG. 3 is a simplified schematic cross section view of a portion of the exemplary generator shown in FIGS. 1 and 2 according to an embodiment of the present invention.

Turning now to FIG. 3, which is a simplified cross section side view representative of the schematic and physical high power generators described above, it is seen that the shaft 136 includes an inner surface 302 that defines an internal fluid flow passage 304, and an outer surface 306. The shaft 136 receives a supply of cooling fluid such as, for example, oil or other lubricant, via an opening 308 in a first end 312 thereof. The supplied cooling fluid flows through the opening 308 and into and through the internal fluid flow passage 304 toward a closed second end 314 of the shaft 136.

As FIG. 3 also depicts, the shaft 136 additionally includes a plurality of end turn cooling supply orifices 316, and a plurality of interlamination cooling supply orifices 318. The end turn cooling supply orifices 316 and the interlamination disk cooling supply orifices 318 each extend between the shaft inner 302 and outer 306 surfaces, and are thus in fluid communication with the internal fluid flow passage 304. In the depicted embodiment, the end turn cooling supply orifices 316 and the interlamination cooling supply orifices 318 are both preferably circumferentially disposed on, and evenly spaced about, the shaft 136. The end turn cooling supply orifices 316, however, are disposed near both ends of the main rotor 132, whereas the interlamination cooling supply orifices 318 are preferably disposed substantially midway between the end turn cooling supply orifices 316. It will be appreciated that the end turn cooling supply orifices 316 may alternatively be provided near only one end of the main rotor 132. Moreover, while the interlamination cooling supply orifices 318 are preferably disposed near an axial center of the main rotor 132, it will be appreciated that these orifices 318 may be otherwise disposed, if so needed or desired.

The main rotor 132, as was noted above, is mounted on the shaft 136, and includes a plurality of poles 322, and a plurality of coils 324 (for clarity, only one shown). The poles 322 extend radially away from the shaft 136 and, as is generally known, are preferably spaced evenly apart from one another. The poles 322 are formed of a plurality of laminations 326 and an interlamination disk 328, both of which are shrunk fit onto, or otherwise coupled to, the shaft 136. The rotor laminations 326, as is generally known, are continuous stacks of a magnetically permeable material. The particular material may be any one of numerous magnetically permeable materials. In a particular preferred embodiment, the laminations 326 are formed of a magnetic alloy material such as, for example, vanadium permendur. It will be appreciated that this material is only exemplary, and that other suitable materials can be used for the rotor laminations 326.

The interlamination disk 328 is disposed between at least two of the rotor laminations 326, and includes a plurality of fluid inlets 332, a plurality of fluid outlets 334, and a plurality of interlamination flow passages 336. It will be appreciated, however, that for clarity and ease of illustration, only two fluid inlets 332, one fluid outlet 334, and two interlamination flow passages 336 are depicted in FIG. 3. Preferably, each interlamination disk fluid inlet 332 is collocated with at least one of the interlamination cooling supply orifices 318 formed in the shaft 136. As such, each interlamination flow passage 336, which extends between one of the fluid inlets 332 and one of the fluid outlets 334, is in fluid communication with the shaft internal fluid flow passage 304. The interlamination disk 328 is formed of a high-strength material such as, for example, magnetic iron or other magnetically permeable metal or metal alloy. It will be appreciated that this material is merely exemplary, and that other suitable materials may be used to form the interlamination disk 328. It will additionally be appreciated that the main rotor 132 may be implemented with more than one interlamination disk 328, if needed or desired.

The rotor coils 324 are wrapped, one each, around a pole 322, and are preferably formed by wrapping numerous individual wire windings around one of the poles 322. In the depicted embodiment, each rotor coil 324 includes two end turns 332 (e.g., 332-1, 332-2), each of which is made up of wire segments that loop around ends of the pole 322. During generator operation, cooling fluid supplied to the shaft internal fluid flow passage 304 is directed, via centrifugal force, through the end turn cooling supply orifices 316 and the interlamination cooling supply orifices 318. The cooling fluid that is directed through the end turn cooling supply orifices 316 is sprayed onto, among other things, the rotor coil end turns 332, as depicted by flow lines 360. This cooling fluid spray provides cooling to the rotor coil end turns 332 and, as will be described further below, to portions of the main stator 134.

The cooling fluid that is directed through the interlamination cooling supply orifices 318 flows into and through the interlamination disk fluid inlets 332, into and through the interlamination disk flow passages 336, and out the interlamination disk fluid outlets 334. Thus, the cooling fluid flowing through the interlamination disk flow passages 336, together with the cooling fluid flowing through the shaft internal fluid flow passage 304, provides conduction cooling for the main rotor laminations 326. It will thus be appreciated that if the main rotor 132 is implemented with a plurality of interlamination disks 328, a more uniform temperature throughout the main rotor 132 can be achieved. In addition to providing conduction cooling for the main rotor 132, and as will also be described in more detail further below, the cooling fluid that flows out the interlamination disk fluid outlets 334 is directed onto, and provides cooling for, the main stator 134, an embodiment of which will now be described in more detail.

The main stator 134 is also mounted within the generator housing 202, and is positioned such that it is spaced apart from, and surrounds at least a portion of, the main rotor 132 to form an air gap 340 there-between. The main stator 134 includes a stator core 338 and a plurality of stator coils 342, and is coupled to the generator housing 202. The stator core 338 is preferably implemented using a plurality of spaced apart stator core sub-assemblies. In the depicted embodiment, the stator core 338 is implemented using two stator core subassemblies 344-1, 344-2, which are spaced apart from each other to form an inter-stator gap 346 there-between. It will be appreciated, however, that the stator core 338 could be implemented with more than this number of stator core subassemblies 344 and inter-stator gaps 346. For example, the stator core 338 could be implemented with "N" stator core subassemblies (e.g., 344-1, 344-2, 344-3, . . . 344-N), and with "N−1" inter-stator gaps (e.g., 346-1, 346-2, 346-3, . . . 346-(N−1)) formed between adjacent stator core subassemblies 344. Although the particular number of stator core subassemblies 344 may vary, preferably the number of stator core subassemblies 344 is selected such that the number of inter-stator gaps 346 formed between adjacent stator core subassemblies 344 matches the number of interlamination disks 328 in the main rotor 132.

No matter the particular number of stator core subassemblies 344 that are used, each is preferably formed of a plurality of laminations 349. The stator core subassembly laminations 349, much like the main rotor laminations 326, are stacks of a magnetically permeable material, which may be any one of numerous magnetically permeable materials such as, for example, vanadium permendur or silicon iron.

The stator coils 342 are wrapped around each of the stator core subassemblies 344, preferably within non-illustrated slots formed in the stator core stator core subassemblies 344. Similar to the rotor coils 324, the stator coils 342 include a pair of end turns 348 (e.g., 348-1, 348-2). It will thus be appreciated that a portion of the cooling fluid spray that is directed onto the rotor coil end turns 332 is also directed onto the stator coil end turns 348, and provides cooling thereto. In addition to this, the stator coils 342 extend across the inter-stator gap 346 formed between the stator core subassemblies 338. As such, and as was previously alluded to, a portion of the cooling fluid that flows out the interlamination disk fluid outlets 334 is directed into the inter-stator gap 346. The cooling fluid directed into the inter-stator gap 346 is directed onto, and flows over, the stator coils 342 within the gap 346 and a portion of the stator core subassembly laminations 349, providing additional conduction cooling for both the stator core 338 and the stator coils 342.

Figure 4:
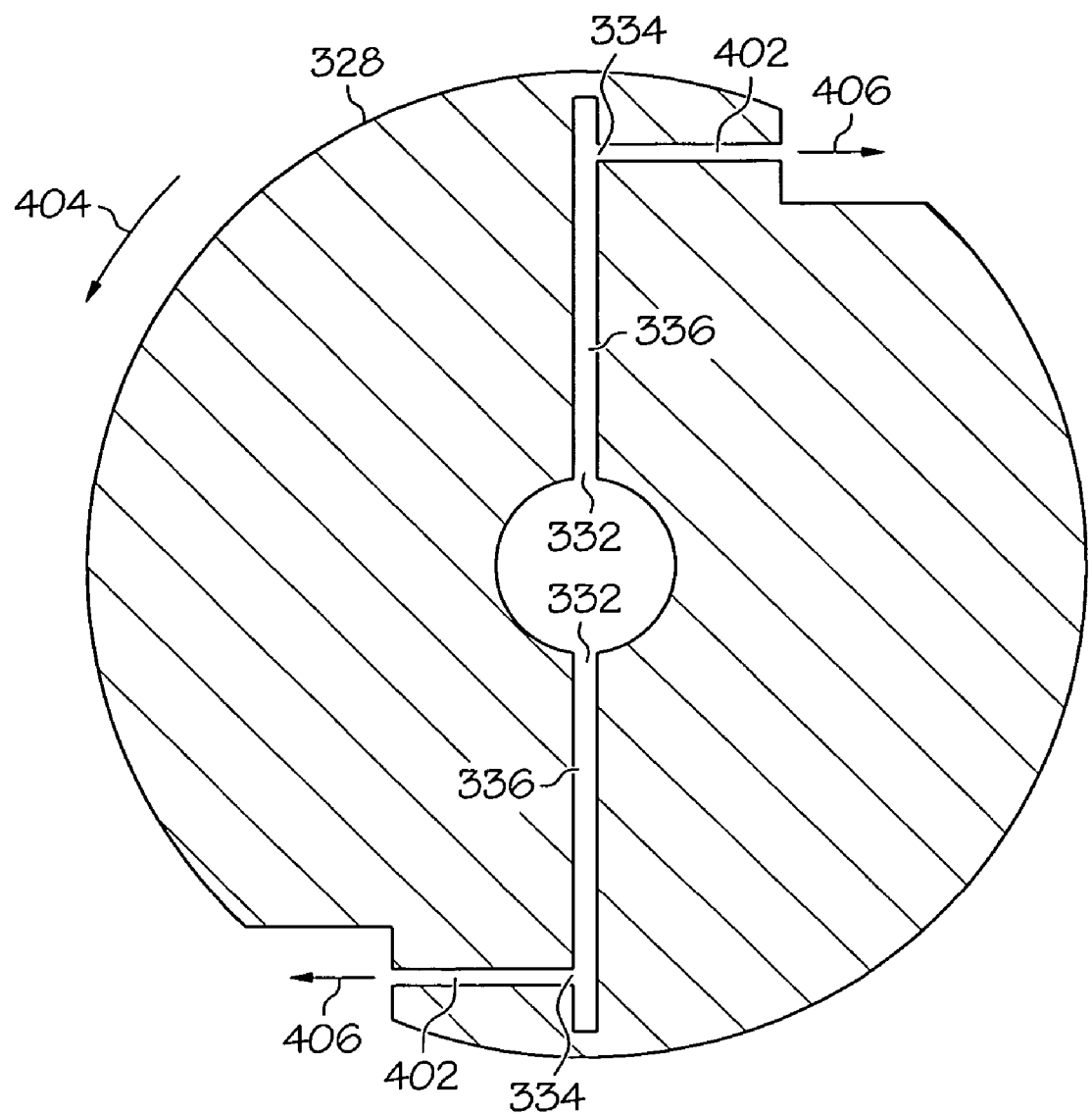
FIG. 4 is a front cross section view of a portion of an exemplary alternative interlamination disk that may be used to implement the generators shown in FIGS. 1-3 according to an embodiment of the present invention.
Figure 5:
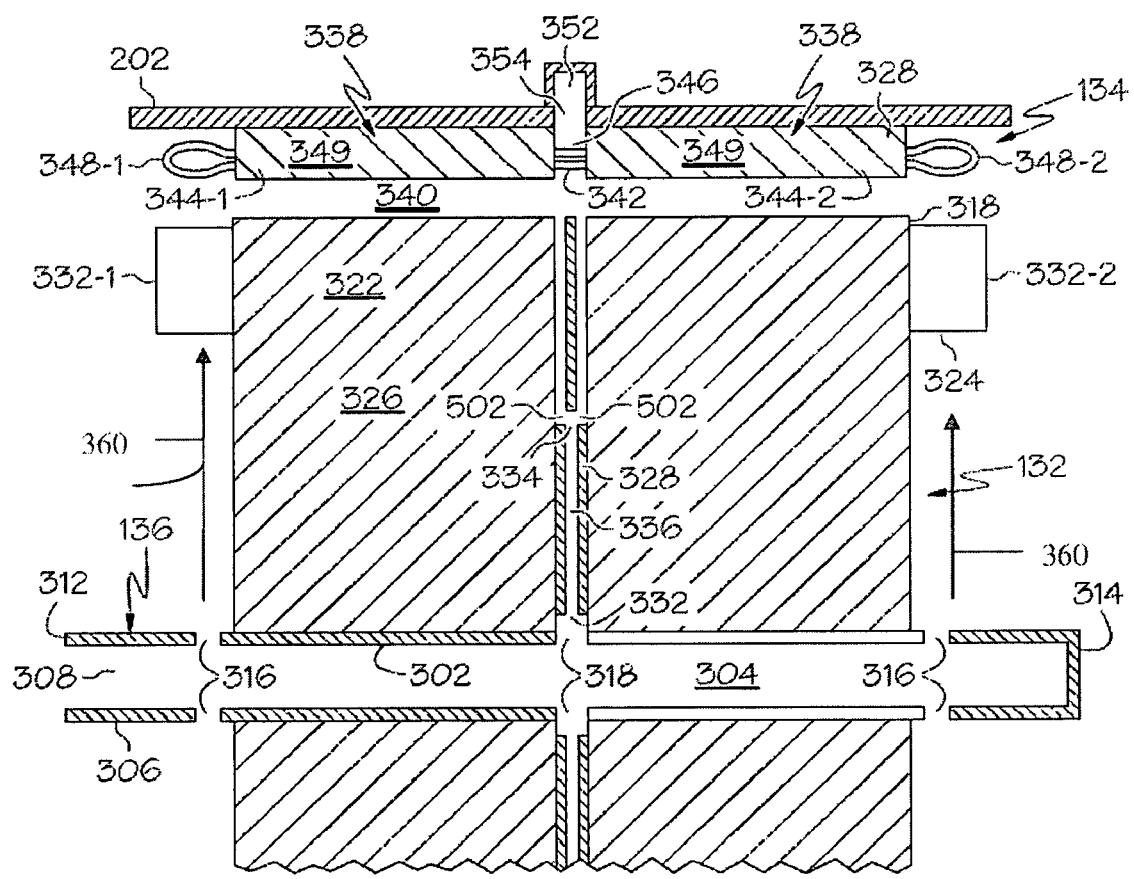
FIG. 5 is a simplified schematic cross section view of a portion of the exemplary generator shown in FIGS. 1 and 2, which includes an exemplary alternative interlamination disk according to an embodiment of the present invention.

The cooling fluid may be directed into the inter-stator gap 346 at a relatively high velocity, which may lead to erosion of the stator coils 342 within the inter-stator gap 346. Thus, the velocity of the cooling fluid in the interlamination disk flow passages 336 is preferably reduced prior to being discharged from the main rotor 132. In the depicted embodiment this velocity reduction is implemented by directing a portion of the cooling fluid toward the rotor laminations 326 on one or both sides of the interlamination disk 328. It will be appreciated that this may be accomplished in any one, or combination, of numerous ways. For example, and as shown in FIGS. 4 and 5, the interlamination disk 328 may be configured such that the interlamination flow passages 336 and at least portions of the interlamination disk 328 have radii that are less than the rotor laminations 326 between which it is disposed. With these configurations, the interlamination disk 328 may additionally include one or more velocity reduction flow passages 402 (see FIG. 4) or 502 (see FIG. 5) in fluid communication with each interlamination flow passage 336. Thus, upon exiting the interlamination disk fluid outlet 334, at least a portion of the cooling fluid is directed against the rotor laminations 326, causing a reduction in velocity. It will be appreciated that with the configuration depicted in FIG. 4, the interlamination disk 328 is preferably configured such that the velocity reduction flow passages 402 cause the cooling medium to be sprayed in a direction 404 that is generally opposite the direction 406 in which the rotor 132 is rotating. Although the velocity reduction flow passages 402, 502 are each shown disposed substantially perpendicular to its associated interlamination flow passage 336, it will be appreciated that one or more of the velocity reduction flow passages 402, 502 may be disposed at another predetermined angle relative to its associated interlamination flow passage 336.

Returning once again to FIG. 3, it is additionally seen that the generator housing 202 includes a collection cavity 352. The collection cavity 352, which may be integrally formed as part of the housing 202 or separately formed and coupled to the housing 202, is in fluid communication with the inter-stator gap 346 via a collection flow passage 354. Although not depicted in FIG. 3, it will be appreciated that the collection cavity 352 is additionally in fluid communication with a collection reservoir, such as a non-illustrated sump disposed within the generator housing 202. With this arrangement, the cooling fluid that is directed into the inter-stator gap 346 is directed into the collection cavity 352, and is in turn directed into the non-illustrated sump. It will be appreciated that the generator housing 202 may include more than one collection cavity 352 and collection flow passage 354, if needed or desired. For example, the generator housing 202 is preferably implemented with one collection cavity 352 and one collection flow passage 354 per inter-stator gap 346. Thus, if the stator core 338 is implemented to include more than one inter-stator gap 346, the generator housing 202 will concomitantly be implemented with more than one collection cavity 352 and one collection flow passage 354.

The high speed, high power generator described herein provides enhanced cooling of the main rotor and main stator, most notably near axially positioned centers thereof. The generator also provides enhanced cooling of the stator coils, again most notably near the center of the main stator. As a result, the axial length of the generator can be increased, if needed to meet increase power generation demands, without adversely impacting thermal management of the generator. Although the efficiency of the generator may be adversely affected by directing cooling fluid into the air gap between the main rotor and main stator, the reduction in temperature that is realized mitigates this potential drawback.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A high power generator, comprising:
a generator housing;
a stator mounted within the generator housing;
a shaft rotationally mounted within the generator housing, and including an inner surface that defines an internal fluid flow passage, an outer surface, and a plurality of interlamination cooling supply orifices extending between the shaft inner and outer surfaces and circumferentially disposed on and evenly spaced about the shaft, the internal fluid flow passage configured to receive a flow of a cooling medium, and each interlamination cooling supply orifice in fluid communication with the internal fluid flow passage; and
a rotor mounted on the shaft and disposed at least partially within and spaced apart from the stator to form an air gap there-between, the rotor including:
a plurality of poles, each pole extending radially outwardly from the shaft and formed of at least a plurality of laminations, and
one or more interlamination disks, each interlamination disk disposed between at least two of the laminations and including a plurality of fluid inlets, a plurality of fluid outlets, and a plurality of interlamination flow passages, each fluid inlet in fluid communication with one of the shaft interlamination cooling supply orifices, each fluid outlet in fluid communication with the air gap, and each interlamination flow passage extending between one of the fluid inlets and one of the fluid outlets.

2. The generator of claim 1, wherein the main stator comprises:
a plurality of stator core subassemblies, each stator core subassembly coupled to the generator housing and spaced apart from at least one other adjacent stator core subassembly to form an inter-stator gap there-between, each inter-stator gap radially aligned with one of the interlamination disks.

3. The generator of claim 2, wherein the main stator further comprises a plurality of main stator windings wound on the stator core subassemblies, each stator winding having at least one end turn and extending into an inter-stator gap.

4. The generator of claim 2, further comprising:
one or more collection cavities coupled to the generator housing, each collection cavity in fluid communication with an inter-stator gap.

5. The generator of claim 1, wherein:
the shaft further includes a plurality of end turn cooling supply orifices extending between the shaft inner and outer surfaces, each end turn cooling supply orifice in fluid communication with the internal fluid flow passage;
the main rotor further includes a plurality of rotor windings wound on the rotor poles, each of the rotor windings having at least one end turn; and
the end turn cooling supply orifices are configured such that cooling medium supplied to the internal fluid flow passage flows through at least selected ones of the end turn cooling supply orifices and is directed toward the rotor winding end turns.

6. The generator of claim 5, wherein at least a portion of the cooling medium directed toward the rotor winding end turns is directed toward the stator winding end turns.

7. The generator of claim 1, further comprising:
an exciter rotor mounted on the shaft proximate a first end thereof; and
a permanent magnet generator rotor mounted the shaft proximate a second end thereof.

8. The generator of claim 7, further comprising:
an exciter stator mounted within the generator housing and surrounding at least a portion of the exciter rotor; and
a permanent magnet generator stator mounted within the generator housing and surrounding at least a portion of the permanent magnet generator rotor.

9. A high power generator, comprising:
a generator housing:
a stator mounted within the generator housing:
a shaft rotationally mounted within the generator housing, and including an inner surface that defines an internal fluid flow passage, an outer surface, and a plurality of interlamination cooling supply orifices extending between the shaft inner and outer surfaces, the internal fluid flow passage configured to receive a flow of a cooling medium, and each interlamination cooling supply orifice in fluid communication with the internal fluid flow passage; and
a rotor mounted on the shaft and disposed at least partially within and spaced apart from the stator to form an air gap there-between, the rotor including:
a plurality of poles, each pole extending radially outwardly from the shaft and formed of at least a plurality of laminations, and one or more interlamination disks, each interlamination disk disposed between at least two of the laminations and including a plurality of fluid inlets, a plurality of fluid outlets, and a plurality of interlamination flow passages, each fluid inlet in fluid communication with one of the shaft interlamination cooling supply orifices, each fluid outlet in fluid communication with the air gap, and each interlamination flow passage extending between one of the fluid inlets and one of the fluid outlets, wherein the main stator comprises a plurality of stator core subassemblies, each stator core subassembly coupled to the generator housing and spaced apart from at least one other adjacent stator core subassembly to form an inter-stator gap there-between, each inter-stator gap radially aligned with one of the interlamination disks; and wherein the interlamination cooling supply orifices and the interlamination flow passages are configured such that cooling medium supplied to the internal fluid flow passage flows through at least selected ones of the interlamination cooling supply orifices and the interlamination flow passages and is directed toward the inter-stator gaps.

10. The generator of claim 9, wherein each interlamination disk is configured to reduce a velocity of a cooling medium flowing there-through.

11. The generator of claim 10, wherein:
each lamination has a maximum outer radius;
each interlamination disk has a maximum outer radius; and
the maximum outer radius of each lamination is greater than the maximum outer radius of each interlamination disk.

12. The generator of claim 10, further comprising:
a plurality of velocity reduction flow passages extending through each interlamination disk, each velocity reduction flow passage in fluid communication with and disposed at a predetermined angle relative to the interlamination flow passage.

13. A high power generator, comprising:
a generator housing;
a shaft rotationally mounted within the generator housing, and including an inner surface that defines an internal fluid flow passage, an outer surface, and a plurality of interlamination cooling supply orifices extending between the shaft inner and outer surfaces, the internal fluid flow passage configured to receive a flow of a cooling medium, and each interlamination cooling supply orifice in fluid communication with the internal fluid flow passage;
a stator mounted within the generator housing, the stator including:
a plurality of stator core subassemblies, each stator core subassembly coupled to the generator housing and spaced apart from at least one other adjacent stator core subassembly to form an inter-stator gap there-between, and
a plurality of main stator windings wound on the stator core subassemblies, each stator winding having at least one end turn and extending into an inter-stator gap; and
a rotor mounted on the shaft and disposed at least partially within and spaced apart from the stator to form an air gap there-between, the rotor including:
a plurality of poles, each pole extending radially outwardly from the shaft and formed of at least a plurality of laminations, and
one or more interlamination disks, each interlamination disk disposed between at least two of the laminations and radially aligned with one of the inter-stator gaps, each interlamination disk including a plurality of fluid inlets, a plurality of fluid outlets, and a plurality of interlamination flow passages, each fluid inlet in fluid communication with one of the shaft interlamination cooling supply orifices, each fluid outlet in fluid communication with the air gap, and each interlamination flow passage extending between one of the fluid inlets and one of the fluid outlets.

14. The generator of claim 13, wherein the interlamination cooling supply orifices and the interlamination flow passages are configured such that cooling medium supplied to the internal fluid flow passage flows through at least selected ones of the interlamination cooling supply orifices and the interlamination flow passages and is directed toward the inter-stator gaps.

15. The generator of claim 13, wherein:
the shaft further includes a plurality of end turn cooling supply orifices extending between the shaft inner and outer surfaces, each end turn cooling supply orifice in fluid communication with the internal fluid flow passage;
the main rotor further includes a plurality of rotor windings wound on the rotor poles, each of the rotor windings having at least one end turn; and
the end turn cooling supply orifices are configured such that cooling medium supplied to the internal fluid flow passage flows through at least selected ones of the end turn cooling supply orifices and is directed toward the rotor winding end turns.

16. The generator of claim 15, wherein at least a portion of the cooling medium directed toward the rotor winding end turns is directed toward the stator winding end turns.

17. The generator of claim 13, further comprising:
one or more collection cavities coupled to the generator housing, each collection cavity in fluid communication with an inter-stator gap.

18. The generator of claim 17, wherein each interlamination disk is configured to reduce a velocity of a cooling medium flowing there-through.

19. The generator of claim 18, further comprising:
a plurality of velocity reduction flow passages extending through each interlamination disk, each velocity reduction flow passage in fluid communication with and disposed at a predetermined angle relative to the interlamination flow passage.

20. The generator of claim 18, wherein:
each lamination has a maximum outer radius;
each interlamination disk has a maximum outer radius; and
the maximum outer radius of each lamination is greater than the maximum outer radius of each interlamination disk.

* * * * *